INVENTORS
GOTTFRIED CREMER
BY
Bierman & Bierman
ATTORNEYS

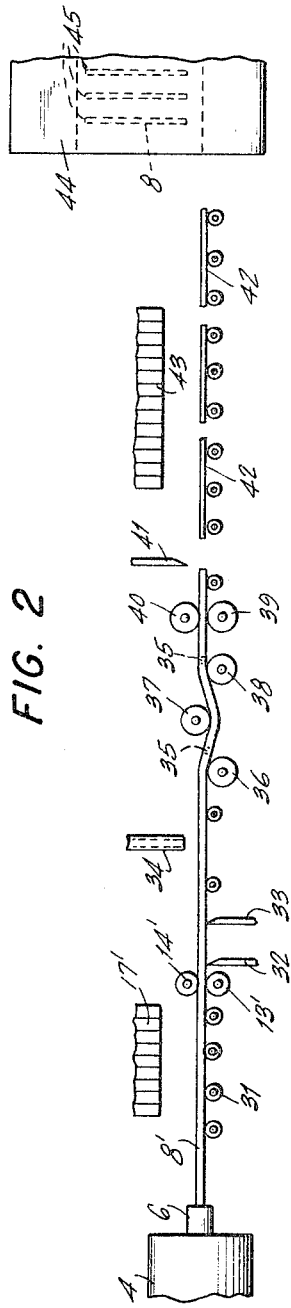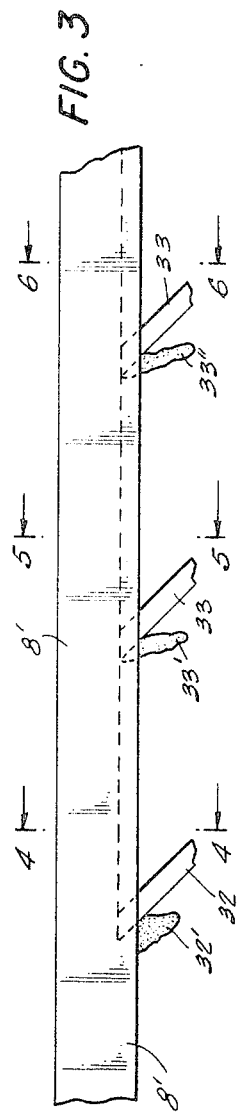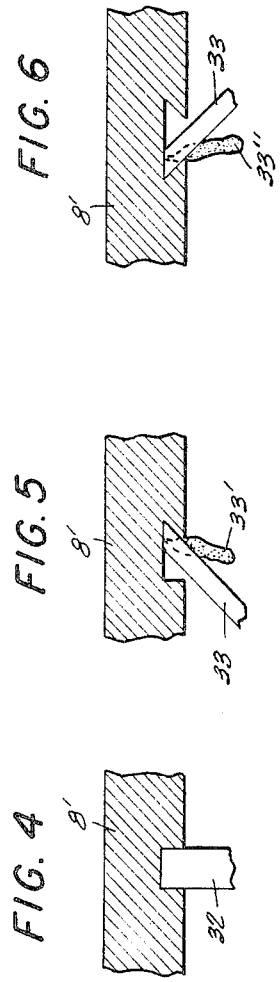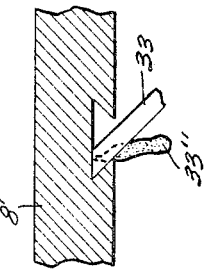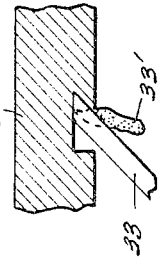

Aug. 23, 1966
G. CREMER
3,268,637
PROCESS FOR THE CONTINUOUS PRODUCTION OF
THIN-WALLED CERAMIC TILES
Filed Aug. 9, 1965
3 Sheets-Sheet 3
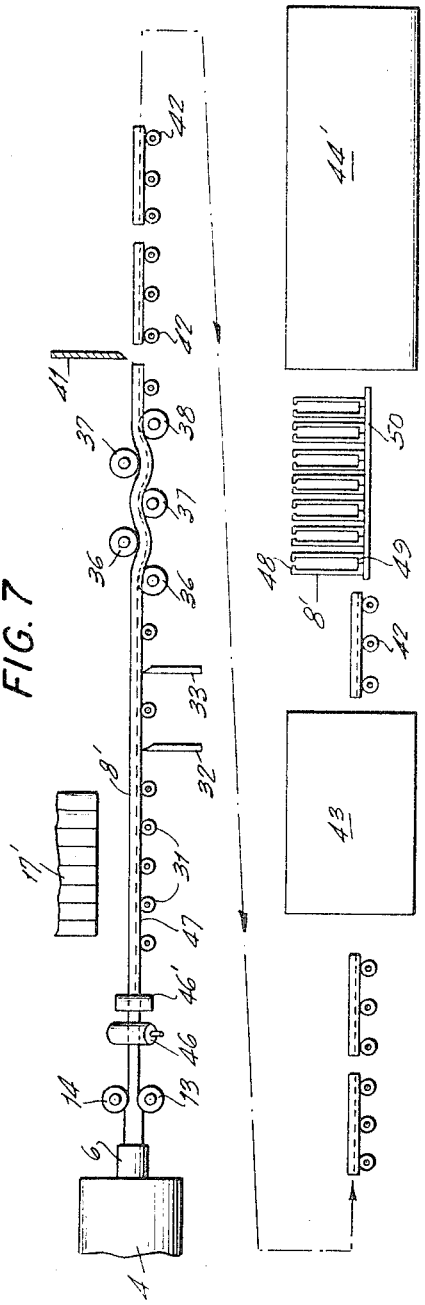
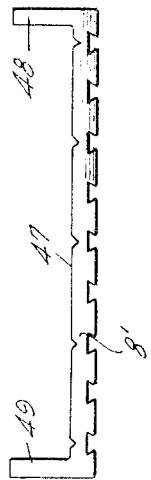
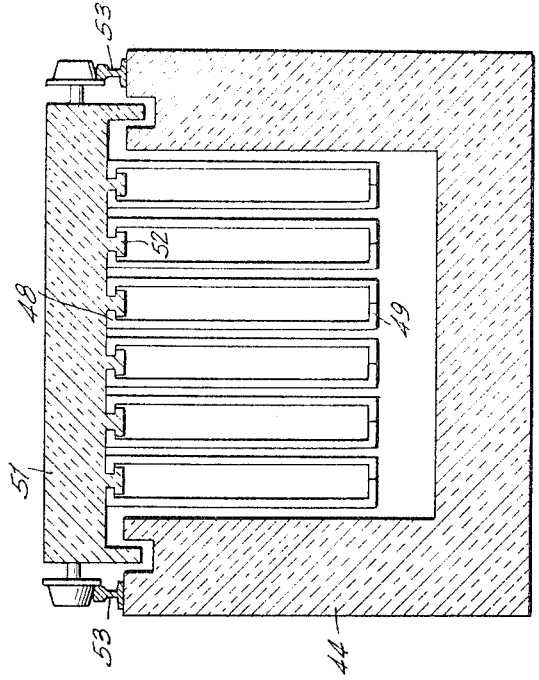
INVENTORS
GOTTFRIED CREMER
BY
Bierman & Bierman
ATTORNEYS

United States Patent Office 3,268,637
Patented August 23, 1966

3,268,637
PROCESS FOR THE CONTINUOUS PRODUCTION
OF THIN-WALLED CERAMIC TILES
Gottfried Cremer, Frechen, near Cologne, Germany,
assignor to Aton G.m.b.H., Frechen, near Cologne,
Germany
Filed Aug. 9, 1965, Ser. No. 478,396
18 Claims. (Cl. 264—58)

This application is a continuation-in-part of applicant's copending application, Serial #125,288, filed April 13, 1961, and Serial #191,898, filed May 2, 1962.

The present invention is directed to the manufacture of facing tiles, and more particularly, it relates to a method of producing large-surface facing tiles of ceramic material and to an apparatus for the carrying out of this method.

The possibilities of manufacturing thin tiles, for instance, those for the exterior covering of buildings, containers for the carrying out of chemical reactions, sanitary installations, etc., have been limited up to now with respect to the possible size of such tiles by the nature of the methods available for this purpose.

The dry pressing method which is preferably used for this purpose and in which a crumb-like ceramic composition having a water content of about 4% is pressed in a mold and the molded article fired after sufficient drying requires high energy consumption since it means the use of relatively high pressures. Nevertheless, it fails to make possible production of tiles of the slight thickness of only 4 to 6 mm. desired for facing tiles in larger sizes than say 25 x 25 cm. Furthermore, it is in practice not possible in the dry pressing method to form, for instance, dovetailed undercuts on the bottom of the tiles, such as are necessary in order to obtain a dependable bond of the tiles to the wall to be faced by means of a mortar which fills up said undercuts.

Another disadvantage of the said dry-pressed tiles is the fact that with increasing size, they exhibit a tendency which reaches excessive amounts, to distort upon the firing and this results in an excessively large percentage of waste.

The use of the extrusion process permits the production of tiles of only slightly larger dimensions than the dry-pressing method, in which connection, however, due to the nature itself of the extrusion method, an undesirably large thickness of the tiles must be tolerated.

A second well known production method for such tiles avoids many disadvantages of the dry-pressing process and in particular produces tiles of high mechanical strength, but at the cost of other disadvantages.

In this second process a hollow section consisting of two half-sections, initially connected together by pairs of double dovetail webs, is extruded, and then lengths thereof being fired and after firing subjected to sintering which gives a low porosity of the order of 5%; splitting in the plance of symmetry of the webs results in two tiles, with the halves of the webs forming the undercut dovetailed projections for anchoring the tiles into the plaster base.

In none of the known methods has it been possible heretofore to increase the size of the tiles to an order of magnitude of more than 30 x 30 square centimeters. This means, when using such tiles as facing tiles, a correspondingly extensive dividing up of the surface to be faced, with the formation of a large number of joints. These numerous joints are not only undesirable from a standpoint of appearance, but in particular, also because of the fact that in the case of exterior facings of structures, they form avenues of attack by atmospheric elements. In the case of linings for containers, sanitary installations, etc., they form avenues of attack for substances exerting a chemically corrosive action, whereby the life of such structures is reduced.

Accordingly, there has been a great desire for large thin tiles which could be laid with a correspondingly smaller number of joints, and which can be applied in excellent manner to the walls of structures, containers, or the like, to be faced by them.

The present invention provides an overall process, characterized by a new sequence of treatment by which there are completely eliminated the difficutiles which previously restricted the use of the prior process for the production of tiles of smaller sizes, by which method tiles of sizes which were heretofore considered entirely impossible. By the present process, tiles, for instance, of up to 3 square meters with any desired thickness down to about 4 mm., can be produced without the danger of warping of the tiles during the drying and firing, and can be provided simultaneously to continuous operation with the undercuts necessary for their attachment to a wall surface.

Applicant provides a process which while avoiding the disadvantages of previously known and normally used processes enables tiles to be produced in an expeditious and efficient manner. The process is applicable to the production both of unglazed and, with still further advantage, of glazed tiles, whose firing has up till now taken place in muffles or tunnel furnaces with their known unfavorable thermal efficiency and heavy demand for manual labor in the insertion and withdrawal of tiles.

The present invention is intended and adapted to overcome the difficulties and disadvantages inherent in methods of the prior art, it being among the objects of the present invention to provide a method of making tiles which is adapted to produce tiles of large areas and relatively thin.

It is also among the objects of the invention to so treat the plastic ceramic composition as to eliminate stresses therein due to working thereof and thus to minimize and eliminate warping of the tiles in the firing thereof.

It is further among the objects of the invention to devise a process which is adapted for continuous production of tiles which is highly efficient, which is largely automatic, which does not require highly skilled operators and which results in low production cost and high output.

The method in accordance with the invention consists that by means of an extrusion press, a strip of somewhat lesser width and somewhat greater thickness than corresponds to the cross section of the tile to be produced is extruded, said strip is sized by a following rolling process, i.e., brought to the desired width and thickness, and then provided with the undercuts in the course of its continuous advance on one of its large surfaces by chip-removing cutting tools past which it moves, and then subjected to another sizing-rolling process and cut into tiles, which are fired in suspended position.

By the rolling or sizing process to which the strip of initially somewhat lesser width and greater thickness than the final cross section is subjected, the stresses unavoidably produced in the extrusion process, as a result of the friction between the shaping surfaces of the extrusion nozzle and the outer regions of the strip of composition passing along same, which stresses are the main reason for the warping of the tiles during the drying and upon the firing, are eliminated.

This action is obtained perfectly when, in accordance with a special feature of the invention, this sizing treatment takes place only after the strip emerging from the extrusion nozzle with about 18% water has been brought by pre-drying to a water content of about 10% in leather-hard condition. This drying can very easily be obtained by the action of radiant heat (for instance of infra-red radiation) during the continuous advance of the strip.

The cutting of dovetailed undercuts into the one large surface of the tile in proper number and arrangement is effected after this sizing treatment—in accordance with a special feature of the invention, preferably by two gaged tools in the form of a pair of knives arranged one behind the other in the direction of movement of the strand, the first of which cuts a central square or rectangular groove while the following one forms the undercuts by forcing the material laterally into the central space formed by the previously cut groove.

Particularly in extreme cases, i.e., in the case of the manufacture of tiles of particularly large sizes and at the same time slight thickness, the strip which, after the sizing treatment described, has the cross-section of the tiles to be produced, can, in accordance with another feature of the invention, be subjected to still another treatment for the purpose of eliminating also the last traces of all stresses by passing it through rolls by means of which it is diverted several times out of its normal straight path alternately in upward and downward direction.

It is also possible to combine with this after-treatment, another sizing treatment, for instance also in the course thereof, while further reducing the thickness of the strip, to increase its width. By this treatment, deformations which might possibly result upon the formation of the grooves are again done away with.

The final drying is effected after the cutting to length also without interruption of the continuous movement, preferably by radiant heat, whereupon the tiles are aligned, preferably supported over their entire surface, and suspended in suitable manner from a conveyor belt in order to be introduced in this position into the firing oven.

By the firing of the tiles in hanging position, the deformations which are unavoidable upon firing in horizontal position appear as firing defects—warping of the final article—as well as the influences of the fact that the oven atmosphere is never homogeneous over the entire cross-section of the oven, which influences are unavoidable in this latter case, are excluded in the present invention.

The firing is preferably effected in tunnel kilns, since such a kiln, particularly in the case of sensitive material, such as thin-walled tiles, better satisfies important prerequisites of as uniform as possible a composition of the kiln atmosphere and possibilities of regulation. In addition there is its fundamental advantage of continuous operation over a batch-wise operated chamber kiln which in itself also permits the firing of the tiles in suspended position.

The suspension of the tiles, the entire outer surface of which is in this way bathed by the kiln atmosphere during the firing, can be effected for example via holes provided in marginal strips which are cut off after the firing and into which the suspension members engage; and in case of low weight of the tiles, also for instance by ceramic tongs, the active surfaces of which suspension members are merely in frictional contact with the surfaces of the tiles, in which case the necessity of providing marginal strips which are subsequently cut away is avoided.

In a modification of the present process a thin strip of plastic clay-containing material is extruded, the strip thickness being somewhat greater than that of the required tiles including the dovetail projections, and its width being determined as that of a plurality of adjacent tiles. This strip then passes through profiling rolls and is rolled to correct thickness and width by these and if necessary also by a plurality of pairs of subsequently disposed rolls, whereby during the course of this treatment grooves are formed in the strip in a pattern corresponding to the dimensions of the required tiles to form cleavage lines along which division of the lengths of extrusion into tiles of the desired shape and dimensions takes place after the subsequent firing. According to a special feature of the invention the strip width is greater than that of a plurality of adjacent plates by an amount such that edge stripes remain on both sides which on passage through the same set of rolls, or possibly a special set disposed subsequently thereto, are bent upwards or downwards at right angles, resulting in a fundamentally U-shaped profile with short legs for the section. The two turned up legs may have equal width, but are preferably of unequal width for reasons explained below. The strip of material then passes, preferably after preliminary drying to the "cheese hard" state by radiant heat, i.e., to a water content of about 10%, past a cutting tool acting on the strip underside which forms the dovetail undercuts serving for subsequent anchorage of the tile in its plaster base.

The grooving of the dovetail undercuts may be, for example, by means of two cutters disposed in sequence in the direction of strip movement, whereby the first cutter cuts a central square or rectangular groove and the subsequent cutter, comprising a pair of blades, forms the undercuts with lateral displacement of the material into the central space left free by the previously cut groove, from which the cutaway material then drops.

Finally, the tile strips are raised on edge and each two disposed so that the flanged edges are directed towards and contact each other.

Each pair of strips with projections turned towards each other forms muffle-like space closed at top and bottom in which adjacent sides of the strips, later to form the fusible faces, are protected from the effects of the furnace atmosphere. If these flanges have differing widths, as mentioned above, the small flanges are disposed at the top of the combined strips in their on-edge position so that a gap is left which allows threading of the pieces on the correspondingly undercut projections on suspension members. The suspension members are preferably suitably shaped refractory rails in a tunnel furnace with a movable suspension roof. With this arrangement the pieces are suspended from the roof of a tunnel furnace and fired while they move along the furnace interior.

In producing glazed tiles, combining each two plates together in this manner into a muffle-like enclosure formed by the material being fired, has the special advantage that fixing in muffle furnaces is rendered unnecessary, since the facing visible sides of the plates, which can be provided with the glaze before drying, are sufficiently protected from the furnace atmosphere within the resulting box-like enclosure.

The scope of the invention also includes the possibility of sealing the boxes formed by two such shaped bodies not only along two edges, but completely, by forming flanges along the other edges also. Alternatively sealing along these edges may be by means of inserted packings of the material.

The feature of forming a muffle of two bodies to be fired by disposing them opposite each other, is generally applicable in the firing of suitable shaped bodies to be glazed on one side. After passing through the tunnel furnace the discard flanges are removed and the pieces divided into individual tiles along the system of grooves.

According to a special feature of the invention the pieces are hung from the tunnel furnace roof in such manner that while their upper edges form a seal with the furnace roof, a certain intermediate space is left between their lower edges and the furnace floor so that a substantial path is provided for furnace gases below the suspended pieces so that said gases are restrained from flowing turbulently about the pieces.

The invention is more fully described in connection with the accompanying drawings constituting a part hereof, in which like reference characters indicate like parts, and in which:

FIG. 2 is a diagrammatic side elevational view of a modified form of the invention;

FIG. 3 is an enlarged side elevational view showing the cutting of dovetailed grooves in one side of the ceramic strip;

FIGS. 4, 5 and 6 are fragmentary enlarged transverse cross-sectional views illustrating the steps of forming the dovetailed grooves;

FIG. 7 is a view similar to FIG. 2 showing a further modification of the present process;

FIG. 8 is an enlarged transverse cross-sectional view of the tunnel furnace showing one means of suspending the tiles during the firing operation; and FIG. 9 is a side elevational view of the tile shown in FIG. 8.

Figure 1:
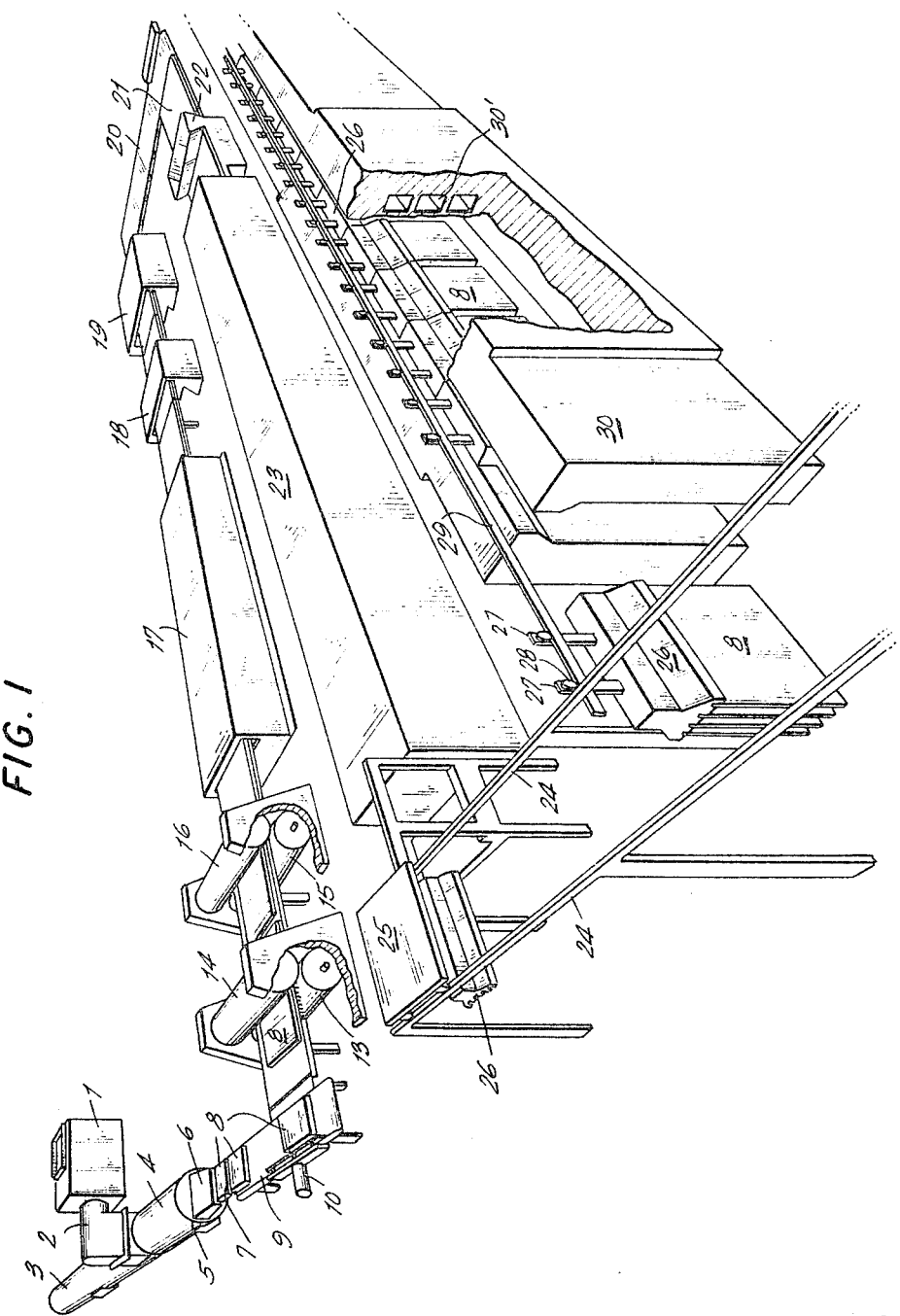
FIG. 1 is a diagrammatic perspective view of a complete system for producing tiles according to the invention.

Referring to FIG. 1, container 1 has the plastic ceramic composition containing water. It is under vacuum in order to eliminate entrained air. The composition enters the system at 2. Cylinder 3 has a piston therein which forces the composition through extrusion press 4 having sieve or strainer 5 at the end to prevent large particles from passing through. Mouth 6 is of the desired shape to form a strip 7 which is slightly thicker and slightly narrower than the finished tile. It is cut by suitable means into individual tiles 8 which are advanced on conveyor 9, from which they are transferred by plunger 10 onto cross-conveyor 11. The tiles then pass between successive pairs of rolls 13–14 and 15–16, where the dimensions are altered to provide a presizing effect. The tiles then pass through drier 17 where enough water is evaporated to form a leather-hard body. Tiles 8 then pass through cutting device 19 where dovetailed grooves are formed by means described below.

Conveyors 20 and 21 transfer the tiles into glazing station 22 where a suitable glaze composition is deposited thereon. Then the tiles pass through a second drier 23 where the water content is reduced to about 4%. A pair of rails 24 have mounted thereon a wheeled carriage 25 from which depends hanger 26. On emerging from drier 23 the individual tiles are hung on or suspended from hanger 26 as seen at the bottom of FIG. 1. Hanger 26 is supported by straps 27 carrying wheels 28 operating on rail 29 leading into muffle furnaces or kiln 30 which provides indirect heat 30' for firing the tiles.

In the embodiment shown in FIG. 2 the presizing is accomplished at 14' after the strip 8' has passed through drier 17'. Then dovetailed grooves are formed in the under side of strip 8' by knives 32 and 33 are shown in FIGS. 3–6. Knife 32 cuts a substantially rectangular groove (FIG. 4) by cutting away material 32'. Then a pair of knives 33 undercut the sides of the groove (FIGS. 5 and 6) by removing material 33' and 33".

Strip 8' then passes under punch 34 which forms holes 35 at suitably spaced points so that when individual tiles are cut from the strip, the holes are adjacent to one end of the tiles. The strip passes between a set of rolls 36–37–38 so placed that the strip is undulated to eliminate stresses in the composition induced by the previous working. The final sizing is performed by passing the strip between rolls 39–40 and, by cutter 41, the tiles are cut from the strip. The tiles are placed on dollies 42 which pass under second drier 43 to reduce the water content to the desired amount. The tiles are suspended on hooks passing through holes 35 and are passed through kiln 44 in the position shown diagrammatically at 45.

In the modification of the process as shown in FIG. 7, the presized strip is subjected to the action of rollers 46 and 46' which act on the strip the lateral edges 47, of which are bent upwardly or downwardly to for flanges as shown in FIG. 9, having one short end flange 48 and a long flange 49. The remainder of the cycle is similar to that shown in FIG. 2, but the tiles are placed on edge on platform 50 with flange 49 supporting the tiles, and pairs of tiles placed face to face. Then they are suspended from the roof 51 of the kiln 44' with flanges 48 held on projections 52. The roof travels on rails 53 through the firing zone. By reason of the pairs of tiles as arranged, there are provided boxes closed in at top and bottom, and the forces produced by this mode of suspension also ensure contact of the faces on the lower flanges. FIG. 8 does not show separate suspension roof rails but, as is also possible, continuous suitably shaped transverse beams are provided which are integrally movable by rollers attached thereto running on lateral rails.

As seen also from FIG. 8, between the lower limits of the pieces and the floor of the furnace passage there remains a substantial free vertical space through which the furnace atmosphere is forced to flow. This space is so dimensioned that the space formed has about 50% greater cross sectional area than the total space between the pieces so that the furnace gases will take this easier path.

The device by which the completely fired and glazed pieces leaving the furnace passage are then divided into individual tiles along the cleavage lines provided, after removal of the lateral flanges, is not shown in the drawings.

Although the invention has been described setting forth several specific embodiments thereof, the invention is illustrated thereby and is not limited thereto. The apparatus shown in the drawing is largely diagrammatic and the individual pieces of equipment may be considerably different in appearance from the showing but performing the desired functions. The invention is in the combination of a number of steps to give the desired final product. Therefore, the invention is to be broadly construed in accordance with the principles set forth herein, and not to be limited except by the character of the claims appended hereto.

I claim:

1. A method for the continuous production of ceramic tiles which comprises extending a flat strip of a plastic ceramic composition, presizing said strip, drying said strip to leather hardness, undercutting one of the faces of said strip, transversely cutting said strip to form individual tiles vertically by supporting the upper ends thereof from a support, suspending said tiles and then passing said tiles through a kiln to fire the same.

2. A method according to claim 1 characterized in that said strip is cut to form said tiles before said drying.

3. A method according to claim 1 characterized in that said strip is cut to form said tiles after said drying.

4. A method according to claim 1 characterized in that said strip is undulated between rollers to eliminate stresses in said strip prior to cutting said tiles.

5. A method according to claim 1 characterized in that a vacuum is applied during said extruding.

6. A method according to claim 1 characterized in that said undercutting is conducted after said drying to leather hardness.

7. A method according to claim 1 characterized in that said composition is further dried to a water content of not over about 4% prior to firing.

8. A method according to claim 1 characterized in that a glaze is applied to said tiles after said undercutting and prior to further drying.

9. A method according to claim 1 characterized in that said tiles are fired in said kiln by indirect flame.

10. A method according to claim 1 characterized in that said strip is presized prior to undercutting.

11. A method according to claim 1 characterized in that said tiles are presized prior to said drying.

12. A method according to claim 1 characterized in that space holes are formed in said strip prior to said undercutting whereby tiles may be suspended in said kiln.

13. A method according to claim 1 characterized in that said undercutting is accomplished in two steps, the first cutting a substantially rectangular recess and the second displacing said composition from at least one wall of said recess.

14. A method according to claim 1 characterized in that said extruded strip has a width somewhat smaller and a thickness somewhat greater than the tiles to be produced.

15. A method according to claim 1 characterized in said undercutting forms flanges on the ends of said tiles whereby said tiles may be suspended in said kiln.

16. A process for the continuous production of ceramic wall tiles having longitudinally extending undercut projections on one surface comprising the steps of: extruding a strip of plastic ceramic material; passing said strip through a profiling roll arrangement whereby the surface opposite to said one surface of said strip is impressed with a pattern of longitudinal grooves corresponding to the outlines of a plurality of adjacent and successively disposed individual tiles; bending the marginal edge portions of said strip parallel to the longitudinal axis thereof at right angles to said opposite surface of the strip containing the pattern of grooves; passing said strip at right angles to an arrangement of several successive cutter blades acting on said one surface of said strip to produce dovetail grooves therein; severing said strip into equal lengths sections; passing said sections through preliminary drying means; suspending said sections in pairs from one of the bent marginal edge portions thereof; passing said suspended sections through a firing oven; and dividing said sections into individual tiles along the pattern of grooves.

17. A process as defined in claim 16 wherein said sections are fired in pairs combined with each other into a box-like section with the bent marginal edge portions of said pairs directed towards each other and having their edges in contact.

18. A process as defined in claim 16 wherein the said one bent marginal edge portion is shorter than the opposite edge portion.

References Cited by the Examiner

UNITED STATES PATENTS

| | | | |
|---|---|---|---|
| 782,483 | 2/1905 | Cammeyer | 264—296 |
| 1,513,617 | 10/1924 | Litt | 264—57 |
| 2,371,353 | 3/1945 | Parsons | 264—145 |

FOREIGN PATENTS

| | | |
|---|---|---|
| 115,360 | 7/1942 | Australia. |
| 516,858 | 1/1931 | Germany. |

ROBERT F. WHITE, *Primary Examiner.*

R. B. MOFFITT, *Assistant Examiner.*